Figure 1:
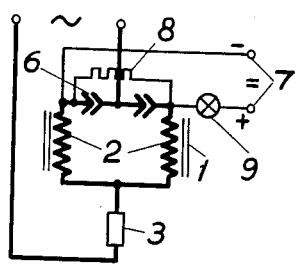

INVENTOR.
Algot Arvidsson

United States Patent Office 2,733,403
Patented Jan. 31, 1956

2,733,403

SELF-EXCITED TRANSDUCTORS

Algot Arvidsson, Saltsjobaden, Sweden, assignor to Allmänna Svenska Elektriska Aktiebolaget, Vasteras, Sweden, a Swedish corporation Application June 16, 1952, Serial No. 293,823

Claims priority, application Sweden June 16, 1951

7 Claims. (Cl. 323—7)

The present invention has for its object an improvement of the invention shown in the copending application, Serial No. 216,523, filed on the 20th March, 1951.

In this a transducer has been proposed comprising substantially two reactor coils or so-called transductor elements. By means of uni-directional electric valves or so-called self-excitation valves one of these coils will pass one half-wave of the alternating current and the other coil the other half-wave thereof. The coils, therefore, will be traversed by current waves in the same direction. Provided that no other current flows through the coils, their iron cores will be excited by direct current and exactly to the same value which corresponds to the alternating current within the load circuit. By neglecting some practical defectiveness such as incomplete choking capacity of the uni-directional valves, the transductor under this condition is entirely unstable, i. e. the magnetic fields in the coils may take up any value of saturation, and therefore, they do not constitute any exact reactance for the alternating current. A slight non-balance of the excitation is sufficient for causing the transductor so to speak to glide in one or the other direction.

If the cores are somewhat over-excited by direct current, the magnetic fields will not oppose against the passage of the alternating current, but the current will increase, with a slight delay of time necessary for the generation of the fields, to the value which is limited only by the impedance of the load, i. e. the load will be supplied with full current. If the cores are slightly under-excited the current will automatically decrease to a value which is limited by the total alternating current impedance of the coils which is very high inter alia due to the fact that the coils as distinguished from conventional reactors have entirely closed iron cores without air gaps. Of course the dimensions of the coils are chosen so that the lowest value of the load voltage is sufficient for the purpose.

The over-excitation is effected according to the above-mentioned patent in that a direct current (control current) is introduced in the self-excitation circuit of the transductor in parallel to the uni-directional valves from a separate current source, preferably over a rectifier. The under-excitation may be effected, for instance, in that the uni-directional valves are shunted by a resistance so that a small amount of the alternating current is passed through the coils during the choking intervals, i. e. in a sense opposite to the main current. However, it is also possible that the uni-directional valves themselves pass a sufficiently large portion of the current. Thanks to the use of the superimposed direct current and the resistance or resistances in parallel to the uni-directional valves, the possibility is gained to control the transductor in either direction for delivering the highest or lowest values of load current. The possibility of attaining a certain desired load current is due to the wiring arrangement itself and is based on the fact that the direct current delivered from the separate control current source depends on the magnitude of the alternating current flowing through the transductor or more exactly on the resistive voltage drop produced by this current within the coils. A certain increase of the voltage of the separate source thus produces foremost a certain increase of the control current. Thereby, the alternating current increases and causes in the coils increasing voltage drop opposed in polarity to the voltage of the separate source. Thereat the control current decreases with the result that a position of equilibrium sooner or later must occur before the control current has reached the value of zero, which is warranted as explained above, by the action of the shunt resistance, which does not allow for the excitation of the transductor to reach said unstable condition or to pass the same.

For the reliable operation of the transductor therefore, this mutual action between the main current and the control current is decisive. If the main current falls off due to an interruption of the load, the control current increases within the main circuit because of the absence of alternating current, due to the fact that the voltage drop generated by the main current in the control circuit intermits. This may give rise to dangerous overload of the control current source, or it may influence the control current of other loads, if such ones are present in an installation.

It is the purpose of this arrangement according to the present invention to overcome this drawback and to prevent the current from hunting, which may occur within the control circuits of so-called single-winding transductors according to the above-mentioned patent.

The principal feature of the invention resides in that an automatical working, current limiting element is inserted in the control circuit for each transductor or in a control circuit common to a plurality of transductors. This element may be a resistance with positive temperature coefficient or another transductor. This transductor may be provided with direct current windings for sensing and comparing excitations which control the excitation in dependency of the voltage or current of the load.

Figure 3:
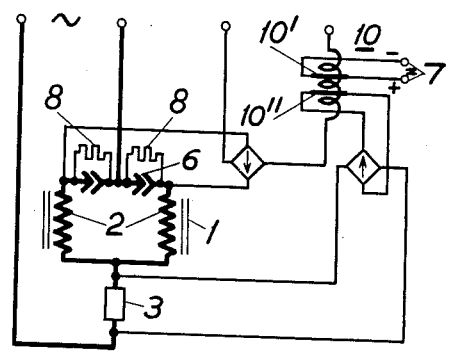
Figure 2:
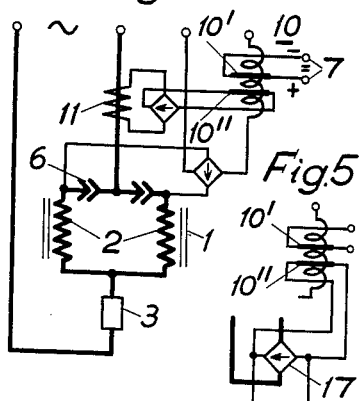
Figures 4, 5:
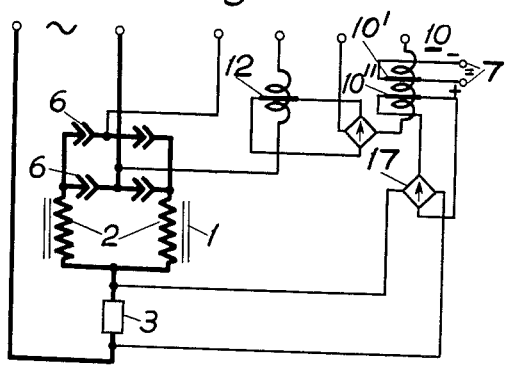
Figure 6:
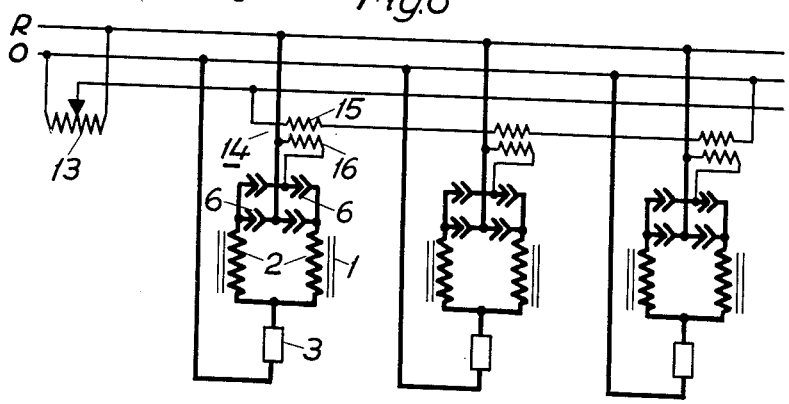

Some examples of wiring arrangements according to the present invention are illustrated in the accompanying drawings, wherein Fig. 1 shows a simple resistance within the control circuit, Fig. 2 and Fig. 3 show a transductor interconnected in the same. Fig. 4 shows an amplifier wiring arrangement, and Fig. 5 a modification wherein the load is fed by direct current. Fig. 6 is a modification wherein a plurality of transductors are controlled by series connected auxiliary transformers.

In all figures, 1 designates the core of the transductor, 2 its alternating current windings, 3 the load, which may be a lamp or a group of lamps, 6 uni-directional electric valves which deliver the self-excitation current. The control direct current is fed from a separate source 7. The partial shunting of the valves 6 is indicated in Fig. 1 and Fig. 3 by resistances 8. As mentioned above, these resistances may be avoided if the valves 6 let through a certain current.

Fig. 1 shows the simplest embodiment of the invention, where the current limitation is effected by a resistance with positive temperature coefficient, for instance an incandescent lamp 9 inserted in the control circuit.

Fig. 2 shows an arrangement in which a transductor 10 is inserted between the current source 7 and the control circuit. This has alternating windings "main windings" and two direct current windings "control windings." One of the direct current windings, the winding $10^{11}$, is fed from a current transformer 11 in the main circuit, and the other winding $10^1$ from separate source 7. The arrangement works in the same manner as described above. Therefore even here the direct current which is delivered from the separate control current source, in this case through the auxiliary transductor, is depending on the magnitude of the alternating current passing the transductor. A certain increase of the voltage from the auxiliary transductor thus produces foremost a certain increase of the control current. Thereby, the transductor is saturated and the load current is increased. By this, however, the current through the current transformer is increased, which acts on the auxiliary transductor in the sense of demagnetization, so that the control current through the main transductor decreases. A position of equilibrium must occur before the control current has reached the value of zero. Should the load circuit be interrupted, no current hunting will occur in the control current source 7, as was the case previously, but it is entirely independent of the load current. Neither will any detrimental overload occur on the auxiliary transductor, so that it may be dimensioned entirely normal.

An additional advantage is gained by the fact that the auxiliary transductor also serves as amplifier so that the control current becomes an order of magnitude smaller than formerly.

Fig. 3 shows an alternative where the resulting excitation of the transductor 10 is made depending on the voltage over the load instead of on the load current. As for the rest, the mode of operation is the same as described with reference to Fig. 2.

The arrangement according to Fig. 4 corresponds substantially to that of Fig. 3 with the difference that an amplifier transductor 12 is interconnected between the control or auxiliary transductor 10 and the control circuit of the main transductors 1, 2. By this arrangement the control power can be diminished considerably. The alternating current of the transductor 12 is fed to the control circuit of the main transductor over dry plate rectifiers in two-way connection. This connection involves the advantage that two branches in the rectifier connection may be used as self-excitation valves 6 for the main transductors 1, 2.

Fig. 5 designates an alternative where the load current is rectified by a rectifier 17. The rectifier 17 in Fig. 4 can thus be avoided.

When a greater number of transductors are to be controlled in parallel, for limiting the control current a wiring arrangement may be used, which is illustrated in Fig. 6. The main transductors 1, 2 are connected in parallel to the network RO. The control current is fed from a means 13, by which the current and the voltage may be adapted to the local requirements of the installation, to the transductors 1, 2 by means of auxiliary transformers 14, the primaries 15 of which are series connected. The secondaries 16 are connected in the same manner as the amplifier transductor of Fig. 4.

The last mentioned arrangement is very advantageous in the illumination of air ports, where the transductors have to be controlled from stations at a long distance often up to 10 km., so that the possibility of adjusting the voltage over the control circuits according to one's desire is particularly valuable. Another advantage is that all transductors receive the same control current, independent of the voltage drop in the lines, even though the lamps are arranged at a long distance from each other as is often the case in practice. The transductors may be assembled in groups in order that not all lamps may be extinguished if an interruption occurs in any transformer and in order to get a more suitable dimensioning thereof, when many lamps are employed.

I claim as my invention:

1. Means for controlling an auto-self-excited transductor having at least one iron core, comprising two parallel-connected alternating current windings on said cores, an alternating current source connected to the junction points of said windings, self-excitation half way valves inserted on both sides of at least one of said junction points, a control circuit connected between the associated ends of said windings, an external power source in said control circuit for superimposing a control current E. M. F. over said alternating current windings, and means for protecting said external power source against overload in case the current from said alternating current source fails, said protecting means comprising an automatic current limiting element.

2. An arrangement according to claim 1, wherein the automatic current limiting element in the control circuit comprises a resistance having distinct positive temperature coefficient.

3. An arrangement according to claim 1, wherein the automatic current limiting element in the control circuit comprises a control transductor.

4. An arrangement according to claim 1, wherein the automatic current limiting element in the said control circuit comprises a control transductor having alternating current windings and two direct current windings traversed by opposed currents, one of which is a constant current for the comparison excitation circuit and the other is a current for the sensing excitation circuit of said transductor, the latter current being derived from the current through the load.

5. An arrangement according to claim 1, comprising a control transductor having alternating current windings and two direct current windings one of which is traversed by a constant current for the comparison excitation circuit and the other is traversed by a current for the sensing excitation circuit of said transductor, the latter current being derived from the current through the load, and arranged to produce a magnetizing ampereturn on the transductor opposing the ampereturns produced by the first-mentioned current.

6. An arrangement according to claim 1, comprising a control transductor having alternating current windings and two direct current windings traversed by opposed currents, one of which is a constant current for the comparison excitation circuit and the other is a current for the sensing excitation circuit of said transductor and is derived from the current through the load, and an amplifier transductor inserted between the said control transductor and the first-mentioned transductor.

7. An arrangement according to claim 1, comprising in said control circuit a control transductor with alternating current windings and two direct current windings traversed by opposed currents, one of which is a constant current for the comparison excitation circuit and the other is a current for the sensing excitation circuit of said transductor and is derived from the current through the load, an amplifier transductor inserted between the said control transductor and the first-mentioned transductor, and a two-way rectifier connection with two branches thereof serving to rectify the current from the said amplifier transductor and two branches thereof serving as self-excitation valves for the main transductor.

References Cited in the file of this patent
UNITED STATES PATENTS 2,518,865    Cartotto _____ Aug. 15, 1950
2,518,953    Sorensen et al. _____ Aug. 15, 1950